(12) United States Patent
Kondas

(10) Patent No.: US 12,046,849 B2
(45) Date of Patent: Jul. 23, 2024

(54) SNAP ON FACEPLATE FOR AN ELECTRICAL RECEPTACLE

(71) Applicant: Group Dekko, Inc., Fort Wayne, IN (US)

(72) Inventor: Shawn J. Kondas, Kendallville, IN (US)

(73) Assignee: Group Dekko, Inc., Fort Wayne, IN (US)

( * ) Notice: Subject to any disclaimer, the term of this patent is extended or adjusted under 35 U.S.C. 154(b) by 394 days.

(21) Appl. No.: 17/505,990

(22) Filed: Oct. 20, 2021

(65) Prior Publication Data

US 2023/0117394 A1    Apr. 20, 2023

(51) Int. Cl.
*H01R 13/453* (2006.01)
*H02G 3/14* (2006.01)

(52) U.S. Cl.
CPC ......... *H01R 13/4534* (2013.01); *H02G 3/14* (2013.01)

(58) Field of Classification Search
CPC .. H01R 13/4534; H01R 13/506; H01R 24/78; H02G 3/14
See application file for complete search history.

(56) References Cited

U.S. PATENT DOCUMENTS

| | | | |
|---|---|---|---|
| 4,544,219 A | 10/1985 | Barkas | |
| 4,867,694 A | 9/1989 | Short | |
| 5,006,075 A | 4/1991 | Bowden, Jr. | |
| 7,183,487 B1 * | 2/2007 | O'Young | H02G 3/14 174/67 |
| 7,312,394 B1 | 12/2007 | Weeks et al. | |
| 7,510,412 B1 | 3/2009 | Valentin | |
| 7,645,148 B2 | 1/2010 | Carbone et al. | |
| 7,942,681 B2 | 5/2011 | Ni | |
| 9,502,807 B2 | 11/2016 | Mortun et al. | |
| 9,543,685 B2 | 1/2017 | Mortun et al. | |
| 10,096,929 B2 | 10/2018 | Lee et al. | |
| 10,424,863 B1 | 9/2019 | Zhuang et al. | |
| 2017/0352978 A1 * | 12/2017 | Mortun | H01R 13/14 |
| 2020/0037422 A1 * | 1/2020 | Shivell | H01H 9/287 |

* cited by examiner

*Primary Examiner* — Michael C Zarroli
(74) *Attorney, Agent, or Firm* — Taylor IP, P.C.

(57) ABSTRACT

An electrical receptacle faceplate couplable to an electrical receptacle housing, the electrical receptacle faceplate including a frontside, a backside, and a plurality of resilient latches. There are a plurality of slots extending from the frontside through the faceplate to the backside. The plurality of resilient latches extend from the backside of the faceplate.

12 Claims, 5 Drawing Sheets

SNAP ON FACEPLATE FOR AN ELECTRICAL RECEPTACLE

BACKGROUND OF THE INVENTION

1. Field of the Invention

The present invention relates to a snap on faceplate for use on an electrical receptacle, which may be in the form of a modular electrical receptacle.

2. Description of the Related Art

In many applications, electrical receptacles are needed to receive and distribute power. They are required in permanent locations such as walls in fixed structures, as well as temporary locations such as modular office furniture. Many types of receptacles are required according to the needs of users. Some receptacles, for example, include distribution of power for computers, telephones, and corded appliance, etc. The electrical receptacles also are required in places that are convenient for the user, and the receptacles may need to be re-located.

Electrical receptacles or outlets are well known as a means for providing an interface between a supply or source of electricity and an appliance, took equipment, or the like. Such receptacles come in a variety of plug configurations, most of which are standardized according to the type of use. For instance, most people are familiar with the standard household receptacle which has a two slots and a round or D-shaped ground opening.

Because of the proliferation of electrical equipment, electrical outlets or receptacles must be safely provided almost everywhere. This is especially true in the workplace, where computers, printers, facsimile machines, telephones, and the like must be connected to an electrical outlet. Also, the workplace has evolved to where there is more than just the conventional type of furniture. Now there are modular units, cubicles and the like which may be located away from walls and other structures where electrical receptacles/outlets are traditionally located. In this type of office furniture, electrical receptacles are typically located along the bottom or side rails of the support structures.

Receptacles generally have a faceplate that covers a portion of the receptacle and provides a finished look to the receptacle. Faceplates are screwed to the receptacle to hold the faceplate in position.

What is needed in the art is a cost-effective, easy to install faceplate for an electrical receptacle.

SUMMARY OF THE INVENTION

The present invention provides an electrical receptacle faceplate.

The invention in one form is directed to an electrical receptacle faceplate couplable to an electrical receptacle housing, the electrical receptacle faceplate including a frontside, a backside, and a plurality of resilient latches. There are a plurality of slots extending from the frontside through the faceplate to the backside. The plurality of resilient latches extend from the backside of the faceplate.

The invention in another form is directed to a receptacle faceplate coupled to a modular electrical receptacle including a faceplate and a modular electrical receptacle. The faceplate has a frontside and a backside. A plurality of slots extend from the frontside through the faceplate to the backside. A plurality of resilient latches extend from the backside. The modular electrical receptacle has a housing, and first and second prong receiving members. The first prong receiving member is in the housing. The second prong receiving member is in the housing, the prong receiving members are respectively positioned proximate to one of the slots. The faceplate is connected to the modular electrical receptacle.

An advantage of the present invention is that the faceplate can be used on multiple versions of the receptacles.

Another advantage of the present invention is that the resilient latches snap the faceplate to the receptacle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
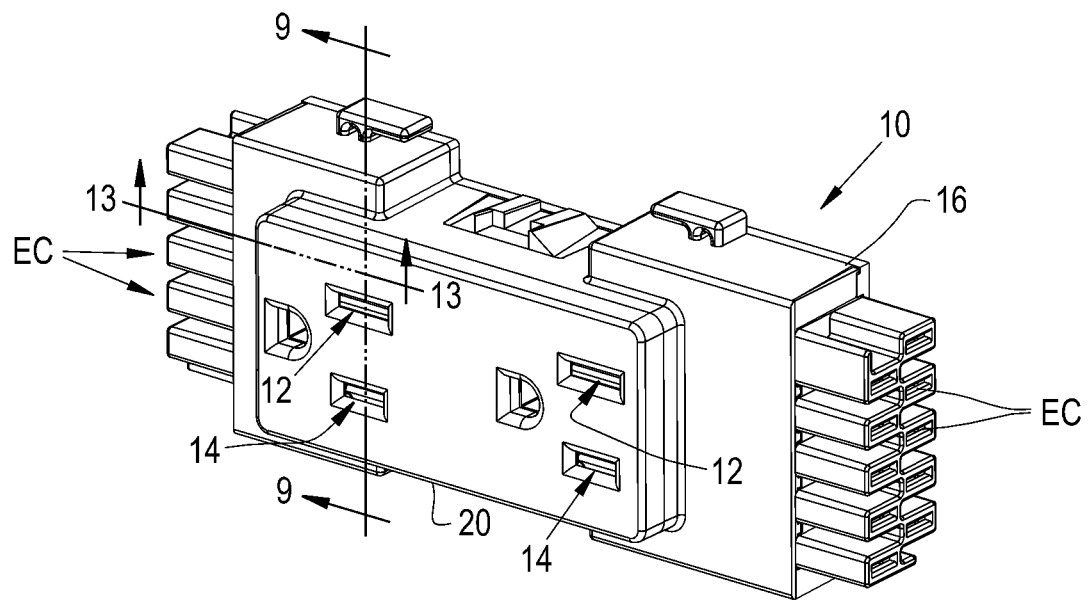
FIG. 1 is a perspective view of an embodiment of a faceplate of the present invention coupled to a tamper resistant modular electrical outlet.
Figure 2:
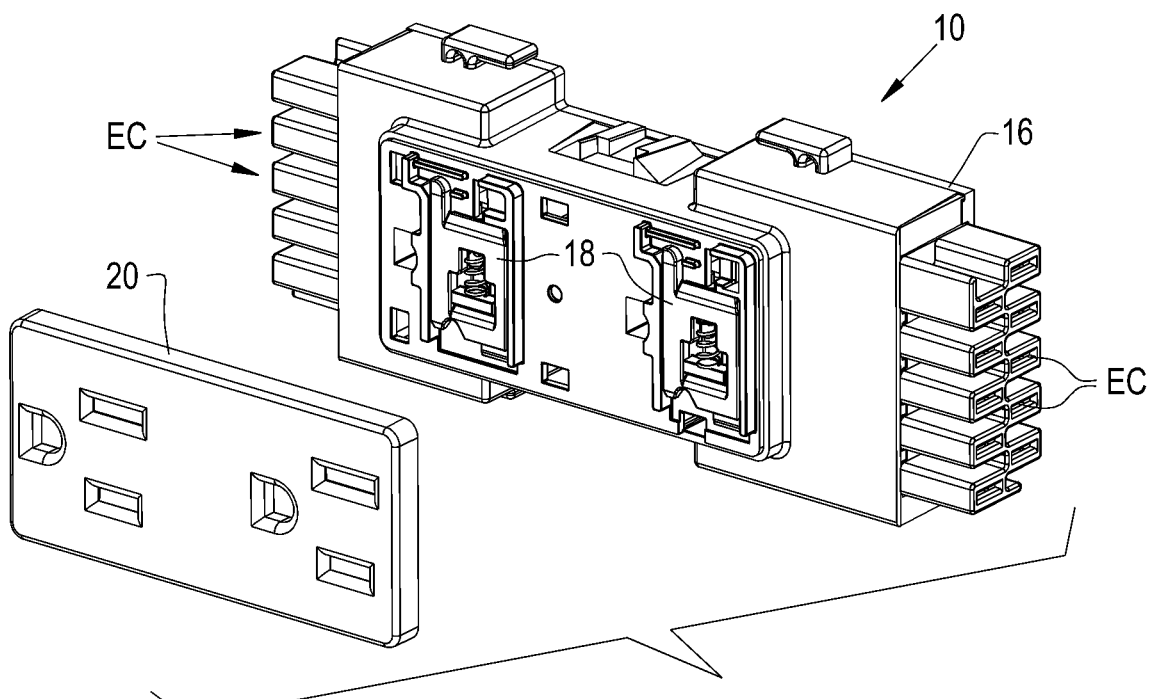
FIG. 2 is a perspective exploded view illustrating the tamper resistant modular electrical outlet of FIG. 1 with the faceplate removed.

Referring now to the drawings, and more particularly to FIGS. 1 and 2, there is shown an embodiment of an electrical receptacle assembly 10 including prong receiving members or slots 12 and 14, a housing 16, a tamper resistant member 18 and a faceplate 20. Housing 16 has prong receiving members 12, 14 positioned therein, for the receiving of prongs of an electrical plug, which is well known and not illustrated. Prong receiving members 12 and 14 are electrically isolated from each other in housing 16, and are in this embodiment configured as a 15 amp. electrical receptacle. Tamper resistant member 18 is slidingly coupled to housing 16 and faceplate 20. Tamper resistant member 18 is restricted from sliding if only portion 22 or 24 of tamper resistant member 18 is pressed upon proximate to just one of the prong receiving members 12 or 14. Electrical receptacle assembly 10 is shown as a modular electrical receptacle assembly 10 with electrical connections EC illustrated on each end thereof. Electrical connections EC allow for the coupling of electrical power such that it may be supplied by way of connections established through faceplate 20, and/or can be through connections suppling power through assembly 10 to other elements by way of electrical conductors, not shown.

Figure 3:
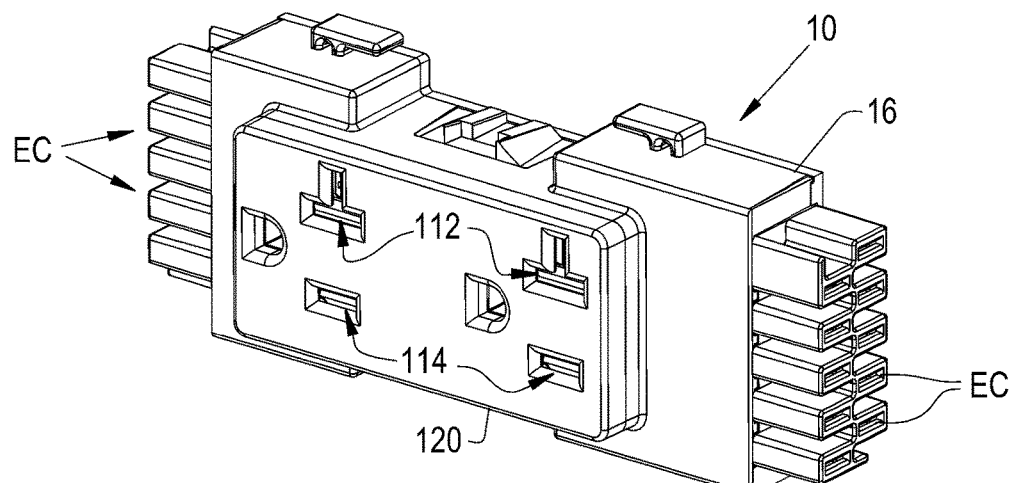
FIG. 3 is a perspective view of another embodiment of a faceplate of the present invention coupled to a tamper resistant modular electrical outlet for a different amperage.
Figure 4:
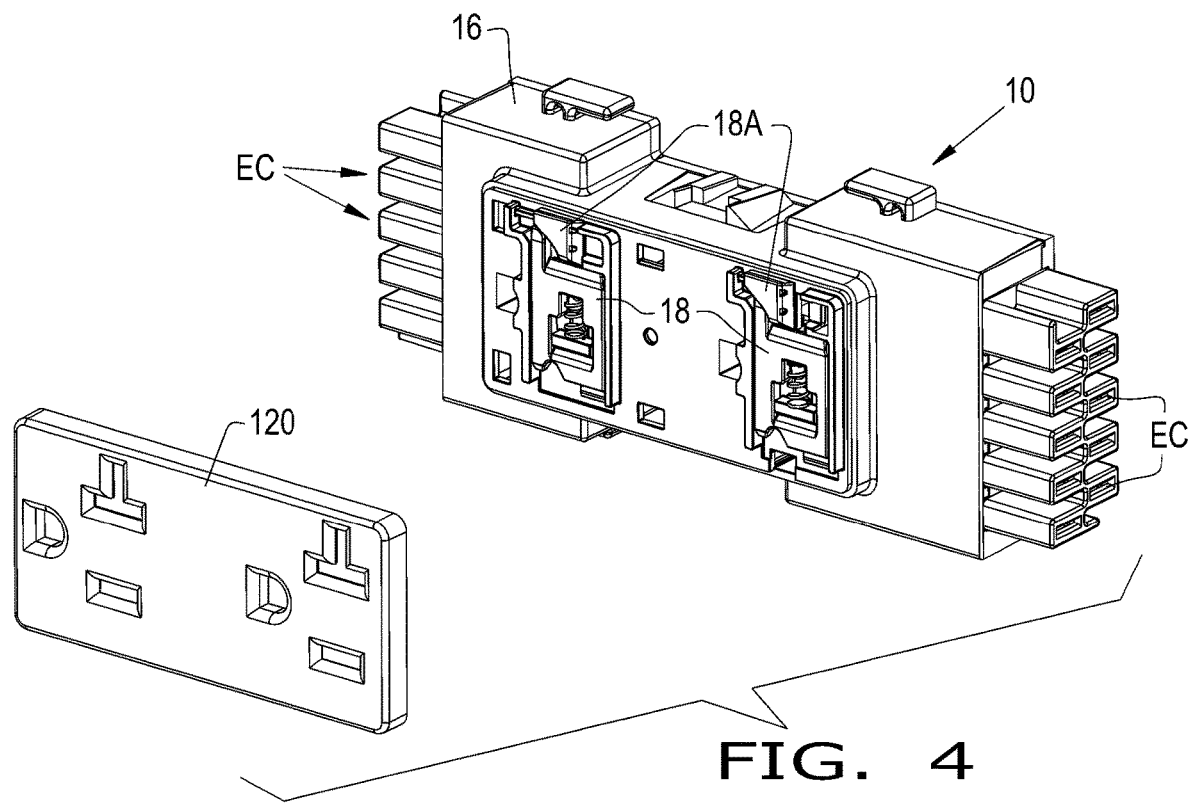
FIG. 4 is a perspective exploded view illustrating the tamper resistant modular electrical outlet of FIG. 3 with the faceplate removed.

Now, additionally referring to FIGS. 3 and 4, there is shown another embodiment of an electrical receptacle assembly 110, with some of the reference numbers being increased by 100, the items being generally similar, and can be thought of as being the same in description, except where they differ. Electrical receptacle assembly 110 including prong receiving members 112 and 114, a housing 16, a tamper resistant member 18, a tamper resistant member 18A and a faceplate 120. Housing 16 has prong receiving members 112, 114 positioned therein, for the receiving of prongs of an electrical plug, which is well known and not illustrated. Prong receiving members 112 and 114 are electrically isolated from each other in housing 16 and are, in this embodiment, configured as a 20 amp. electrical receptacle. Tamper resistant members 18 and 18A are slidingly coupled to housing 16 and faceplate 120. Tamper resistant members 18 and 18A are restricted from sliding if only portion 22 or 24 of tamper resistant member 18 or tamper resistant member 18A is pressed upon proximate to just one of the prong receiving members 112 or 114. Portions 22 and 24 have a characteristic, such as a bevel that allows an inward force of a prong to engage tamper resistant member 18 to thereby result in an exertion of a force generally transverse to the inward force of the prong.

Figure 5:
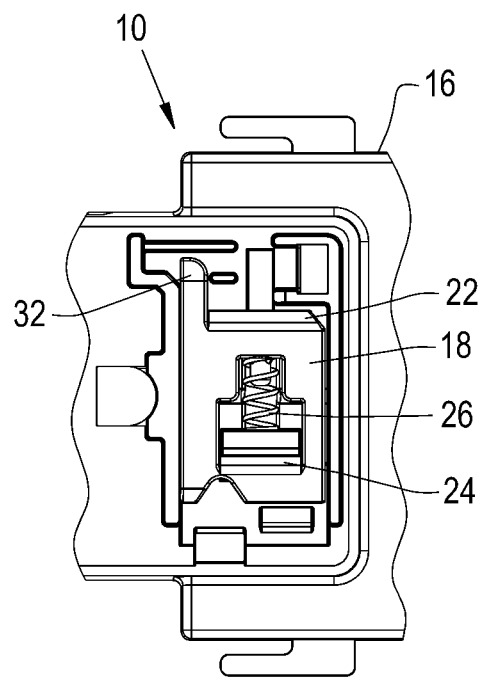
FIG. 5 is a partial front view of the electrical outlet of FIGS. 1 and 2 illustrating a tamper resistant mechanism in a closed position.
Figure 6:
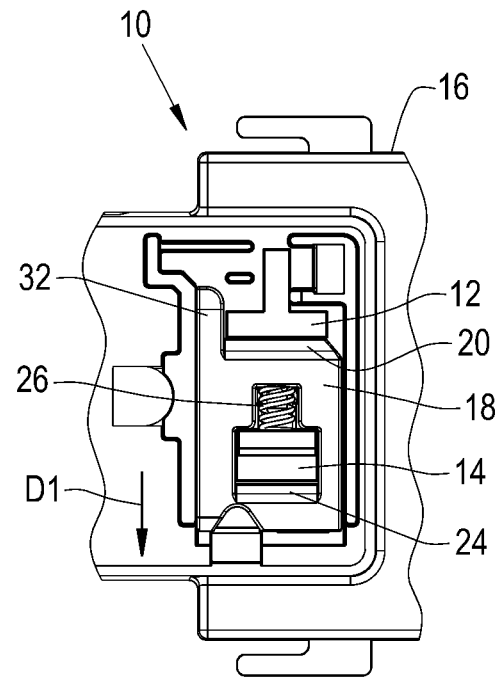
FIG. 6 is another partial front view of the electrical outlet of FIG. 5 with the tamper resistant mechanism in an open position.
Figure 7:
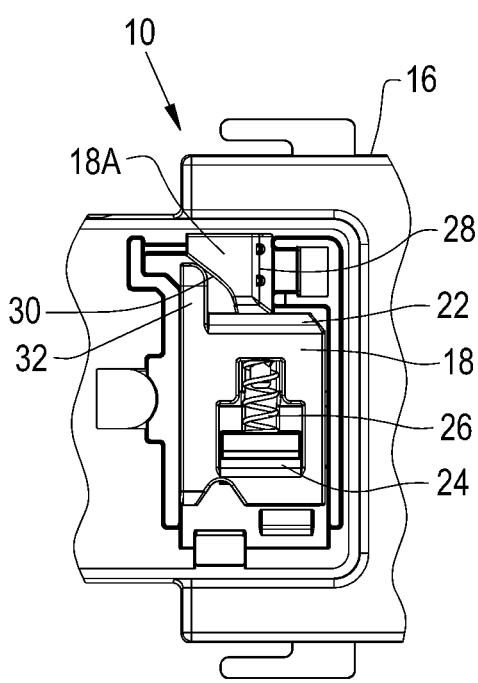
FIG. 7 is a partial front view of the electrical outlet of FIGS. 3 and 4 illustrating a tamper resistant mechanism in a closed position.
Figure 8:
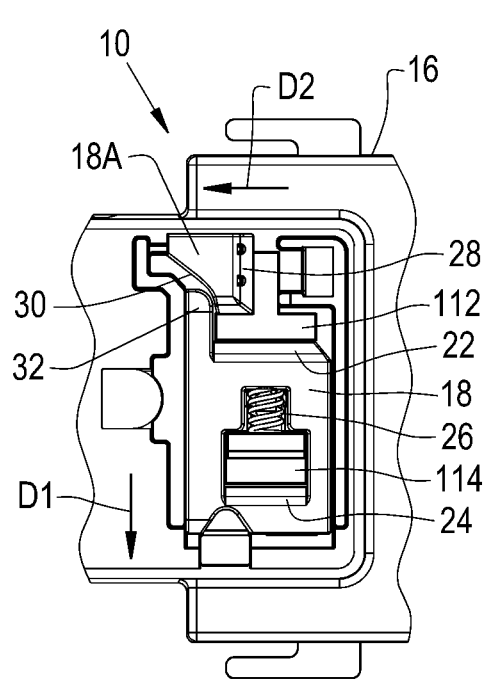
FIG. 8 is another partial front view of the electrical outlet of FIG. 7 with the tamper resistant mechanism in an open position.
Figure 9:
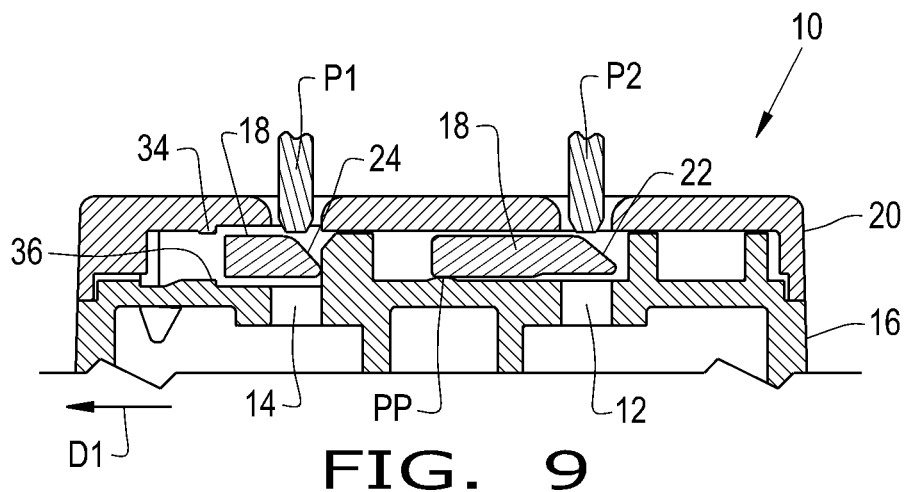
FIG. 9 is a cross sectional view taken along line 9-9 illustrating two electrical prongs entering through a faceplate and contacting the tamper resistant mechanism of FIGS. 5-8.

The force applied by prongs on portions 22 and 24 cause tamper resistant member 18 to move in a direction D1 as illustrated in FIGS. 5-8, where FIGS. 5 and 7 respectively illustrate the 15 amp. and 20 amp. versions with tamper resistant member 18 in a closed position. FIGS. 6 and 8 respectively illustrate the 15 amp. and 20 amp. versions in an open position with prong receiving members 12, 14, 112, 114 being accessible. Prongs that would be inserted are not illustrated here for the purpose of clarity, such prongs are widely known and are illustrated in FIG. 9. The force applied is resisted by a bias member 26, in the form of a coil spring 26, which can be seen in compression in FIGS. 6 and 8, and in an extended position in FIGS. 5 and 7.

In FIGS. 7 and 8 tamper resistant member 18A is illustrated, with an insertion of a prong of a 20 amp. plug tamper resistant member 18A is contacted and moved in direction D2. The prong contacts a portion 28, which similar to portions 22 and 24 is shown as a beveled surface, causing movement of tamper resistant member 18A in direction D2. Tamper resistant member 18A also has an angled portion 30 that interacts with a finger 32 of tamper resistant member 18 to provide lateral pressure on tamper resistant member 18 so as to cause movement of tamper resistant member 18 in direction D1. When the plug is removed, thereby removing the prongs, spring 26 causes tamper resistant member 18 to move in a direction opposite to direction D1 and finger 32 applies a force against angled portion 30 to cause tamper resistant member 18A to move in a direction opposite to direction D2, so that tamper resistant members 18 and 18A return to the closed position of FIG. 7. In a similar manner the 15 amp. version of FIGS. 5 and 6 react, but without tamper resistant member 18A. It should be noted that the functioning of tamper resistant members 18 and 18A in the 20 amp. versions of FIGS. 7 and 8 allow for the insertion of a plug that is configured as a 15 amp. plug since the prongs thereof contact portions 22 and 24 of tamper resistant member 18, just as in the 15 amp. version of FIGS. 5 and 6. This of course makes the functioning of tamper resistant members 18 and 18A transparent to the one inserting a plug of either configuration.

The layout of faceplates 20 and 120 are such that they control the entry of prongs as well, with faceplate 20 precluding the insertion of a 20 amp. plug. It is contemplated that the mechanisms of tamper resistant members 18 and 18A could be present in assembly 10 and the selection of either faceplate 20 or faceplate 120 can be used to then designate that assembly 10 is a 15 amp. or a 20 amp. outlet, with the decision being made in conjunction with the wiring to, and fusing of, assembly 10.

Figure 10:
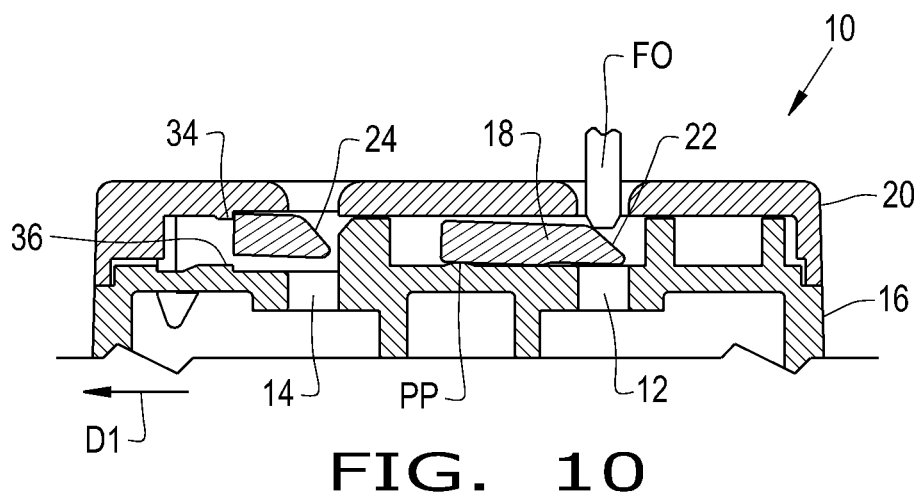
FIG. 10 is another view of the cross-sectional view of FIG. 9 illustrating one electrical prong entering through the right opening of the faceplate and contacting the tamper resistant mechanism of FIGS. 5-8.
Figure 11:
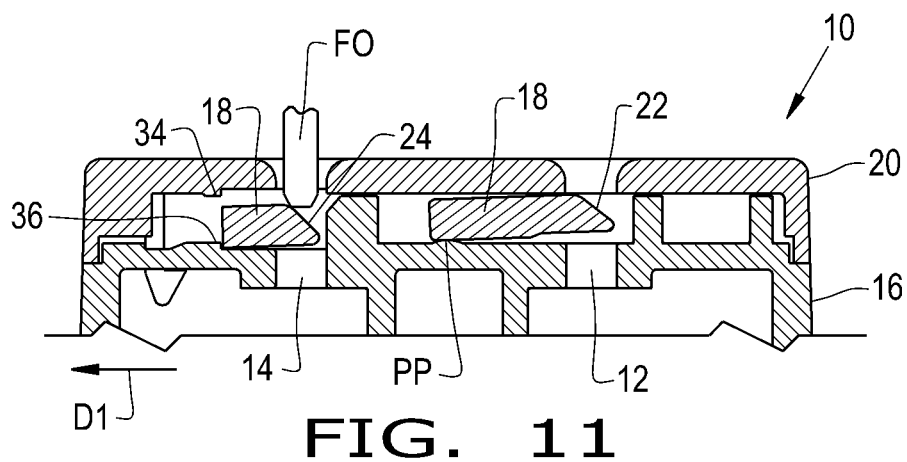
FIG. 11 is yet another view of the cross-sectional view of FIGS. 9 and 10 illustrating one electrical prong entering through the left opening of the faceplate and contacting the tamper resistant mechanism of FIGS. 5-8.

Now, additionally referring to FIGS. 9-11 there are illustrated cross sectional views of assembly 10 taken along line 9-9, for the purpose of showing how movement of tamper resistant member 18 is inhibited if there are not two prongs entering assembly 10. In FIG. 9 a normal insertion of a plug having prongs P1 and P2 is illustrated. Prongs P1 and P2 respectively contact portions 24 and 22 of tamper resistant member 18, which cause tamper resistant member 18 to move in direction D1 with a balance of force on each side of pivot point PP. Because of the simultaneous, or nearly simultaneous contact of prongs P1 and P2 to tamper resistant member 18 the movement of tamper resistant member 18 proceeds in direction D1 as tamper resistant member 18 slides across pivot point PP, such that tamper resistant member 18 is balanced in moving and tamper resistant member 18 avoids engaging with, or contacting, edges 34 and 36. Edge 34 is part of faceplate 20, and edge 36 is part of housing 16. This balanced movement of tamper resistant member 18 continues as tamper resistant member 18 moves to the open position and prongs P1 and P2 respectively enter prong receiving members 14 and 12, allowing electrical contact.

In FIG. 10, a foreign object FO enters through faceplate 20 contacting portion 22. As can be seen this causes a cant or unbalanced orientation in tamper resistant member 18, with the tolerance between faceplate 20 and housing 16 as well as pivot point PP allowing this orientation due to the unbalanced force on just portion 22. This cant about pivot point PP and slight movement in direction D1 causes tamper resistant member 18 to engage edge 34, which serves to stop further movement of tamper resistant member 18 in direction D1, and accomplishing the tamper resistant purpose of tamper resistant member 18. When foreign object FO is removed then tamper resistant member 18 will shift slightly in the direction opposite of direction D1, causing tamper resistant member 18 to disengage from edge 34 and to rebalance or center in the space between faceplate 20 and housing 16 due to the bias of spring 26.

In a similar fashion, as shown in FIG. 11, foreign object FO enters through faceplate 20 contacting portion 24 (and not portion 22). As can be seen this causes a cant in tamper resistant member 18 about pivot point PP, with the tolerance between faceplate 20 and housing 16 allowing this orientation due to the unbalanced force on just portion 24. This cant and slight movement in direction D1 causes tamper resistant member 18 to engage edge 36, which serves to stop further movement of tamper resistant member 18 in direction D1, and accomplishing the tamper resistant purpose of tamper resistant member 18. When foreign object FO is removed then tamper resistant member 18 will shift slightly in the direction opposite of direction D1, causing tamper resistant member 18 to disengage from edge 36 and to rebalance or center in the space between faceplate 20 and housing 16 due to the bias of spring 26.

Prong receiving members 12, 14, 112, 114 are respectively positioned apart and electrically isolated from each other, in their versions of assembly 10. As discussed above, tamper resistant member 18 is slidingly coupled to housing 16 and faceplate 20, 120, with tamper resistant member 18 having sufficient space to reorient or cant when an unbalanced force is applied. This unbalanced force from a foreign object FO causes tamper resistant member 18 to be restricted from sliding in direction D1 if only a one portion 22 or 24 of tamper resistant member 18 is pressed upon proximate to one of the prong receiving members 12, 14, 112, 114. When the portions 22 and 24 of tamper resistant member 18 are pressed at the same time then tamper resistant member 18 slides to an open position overcoming the bias of bias member 26.

Portions 22 and 24 of tamper resistant member 18 and portion 28 of tamper resistant member 18A are each beveled or have a chamfered area that are positioned respectively outwardly from prong receiving members 12, 14, 112, 114 when tamper resistant member 18 is in the closed position, and the chamfered areas 22, 24, 28 are moved aside when prongs of a plug contact chamfered areas 22, 24, 28 as the prongs are directed to prong receiving members 12, 14, 112, 114.

One advantageous aspect of the present invention is that tamper resistant member 18 is unbalanced only when either portion 22 or portion 24 is pressed by themselves. This unbalance causes tamper resistant member 18 to engage with either edge 34 or 36 thereby precluding sliding movement of tamper resistant member 18.

Figure 12:
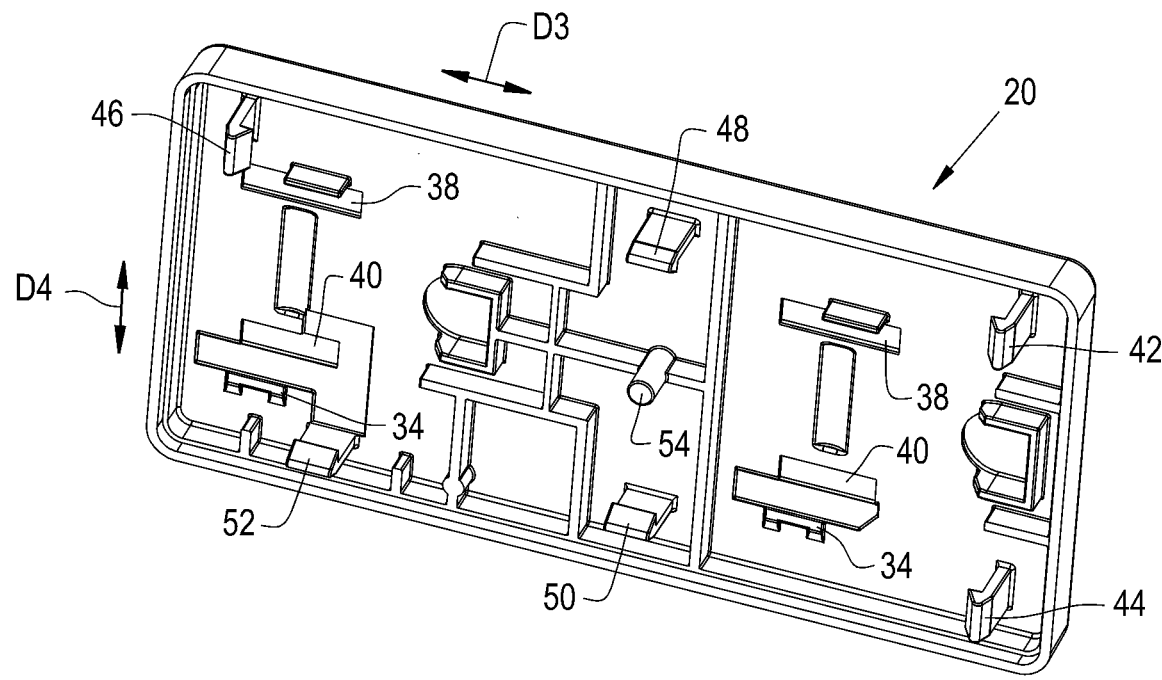
FIG. 12 is a perspective view of the faceplate of FIGS. 1 and 2 illustrating elements of the backside of the faceplate.
Figure 13:
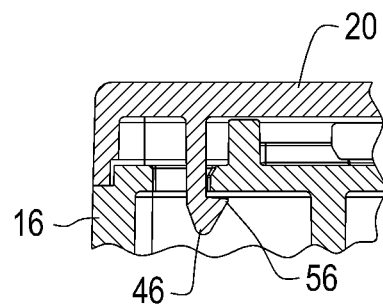
FIG. 13 is a partial cross-sectional view of the faceplate of FIGS. 1, 2 and 12, coupled with a receptacle of FIGS. 1 and 2, taken along line 13-13.

Now, additionally referring to FIGS. 12 and 13, there is shown faceplate 20 that snaps onto housing 16. As discussed above, faceplate 20 (or 120 depending on whether a 15 or 20 amp. configuration is selected) is arranged to allow tamper resistant member 18 to slide between an inside surface and a surface of housing 26. The spacing also being selected to allow tamper resistant member 18 to cock to a side if force is applied in an unbalanced manner to catch either edge 34 or 36. Faceplate 20 has slots 38 and 40 to accommodate prongs P1 and P2, and resilient latches 42, 44, 46, 48, 50 and 52, which interact with portions of housing 16 to secure faceplate 20 to housing 16. Resilient latches 42, 44, 46, 48, 50 and 52 enter through openings in housing 16 and are shaped so that they flex and then catch onto a portion of housing 16, thereby securing faceplate 20 to housing 16. Resilient latches 42, 44 and 46 are arranged in three corners of the backside of faceplate 20 each arranged to flex in a direction D3 that is oriented parallel to the longest part of faceplate 20. Resilient latches 48, 50 and 52 are arranged along sides of faceplate 20 and are each arranged to flex in a direction D4 that is oriented parallel to the width part of faceplate 20. Resilient latches 42, 44, 46, 48, 50 and 52 are all arranged to generally flex outwardly from a central portion, such as location 54 of faceplate 20. When faceplate 20 is fully engaged with housing 16, a retaining feature 56 (common to all resilient latches illustrated here on resilient latch 46 in FIG. 13) is engaged with a corresponding surface in housing 16. Feature 56 on resilient latches 42, 44, 46, 48, 50 and 52 are all directed inwardly, relative to the perimeter of faceplate 20.

Receptacle faceplate 20 has a frontside that is visible to the user and a backside from which resilient latches 42, 44, 46, 48, 50 and 52 extend which serve to hold faceplate 20 to housing 16. Resilient latches 42, 44, 46, 48, 50 and 52 are oriented inward relative to a perimeter of faceplate 20, with retaining features 56 oriented inwardly.

As discussed above tamper resistant member 18 is slidingly positioned between the backside of faceplate 20 and housing 16, with tamper resistant member 18 being restricted from sliding if only portion 22 or 24 of tamper resistant member 18 is pressed upon proximate to one of slots 38 or 40. Tamper resistant member 18 slides when portions 22 and 24 of tamper resistant member 18 are pressed at the same time through slots 38 and 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical receptacle faceplate couplable to an electrical receptacle housing, the electrical receptacle faceplate comprising:
   a frontside;
   a backside;
   a plurality of slots extending from the frontside through the faceplate to the backside; and
   a plurality of resilient latches extending from the backside;
   wherein a tamper resistant member is slidingly positioned between the backside of the faceplate and the housing, the tamper resistant member being restricted from sliding if only a first portion of the tamper resistant member is pressed upon proximate to one of the slots, the tamper resistant member slides when the first portion and a second portion of the tamper resistant member are pressed at the same time through two of the slots, a first edge is part of the housing, a second edge is part of the faceplate, the tamper resistant member engages the first edge when only a first portion of the tamper resistant member is pressed, and the tamper resistant member engages the second edge when only a second portion of the tamper resistant member is pressed.

2. The electrical receptacle faceplate of claim 1, wherein the tamper resistant member has a bias member biasing the tamper resistant member to a closed position blocking at least two of the slots.

3. The electrical receptacle faceplate of claim 2, wherein a biasing force from the bias member is overcome causing the tamper resistant member to slide when the first portion and the second portion of the tamper resistant member are pressed at the same time though the two slots.

4. The electrical receptacle faceplate of claim 1, wherein the resilient latches each have a retaining feature that engages a surface in the housing to hold the faceplate to the housing.

5. The electrical receptacle faceplate of claim 4, wherein each of the retaining features are oriented inward relative to a perimeter of the faceplate.

6. The electrical receptacle faceplate of claim 4, wherein the plurality of resilient latches is six resilient latches.

7. A receptacle faceplate coupled to a modular electrical receptacle, comprising:
  a faceplate having:
    a frontside;
    a backside;
    a plurality of slots extending from the frontside through the faceplate to the backside; and
    a plurality of resilient latches extending from the backside;
  wherein the modular electrical receptacle has:
    a housing;
    a first prong receiving member in the housing; and
    a second prong receiving member in the housing, the prong receiving members respectively positioned proximate to one of the slots;
  wherein the faceplate is connected to the modular electrical receptacle;
  wherein a tamper resistant member is slidingly positioned between the backside of the faceplate and the housing, the tamper resistant member being restricted from sliding if only a first portion of the tamper resistant member is pressed upon proximate to one of the slots, the tamper resistant member slides when the first portion and a second portion of the tamper resistant member are pressed at the same time through two of the slots, a first edge is part of the housing, a second edge is part of the faceplate, the tamper resistant member engages the first edge when only a first portion of the tamper resistant member is pressed, and the tamper resistant member engages the second edge when only a second portion of the tamper resistant member is pressed.

8. The receptacle faceplate of claim 7, wherein the tamper resistant member has a bias member biasing the tamper resistant member to a closed position blocking at least two of the slots.

9. The receptacle faceplate of claim 8, wherein a biasing force from the bias member is overcome causing the tamper resistant member to slide when the first portion and the second portion of the tamper resistant member are pressed at the same time though the two slots.

10. The receptacle faceplate of claim 7, wherein the resilient latches each have a retaining feature that engages a surface in the housing to hold the faceplate to the housing.

11. The receptacle faceplate of claim 10, wherein each of the retaining features are oriented inward relative to a perimeter of the faceplate.

12. The receptacle faceplate of claim 10, wherein the plurality of resilient latches is six resilient latches.

* * * * *